Figures 1, 2:
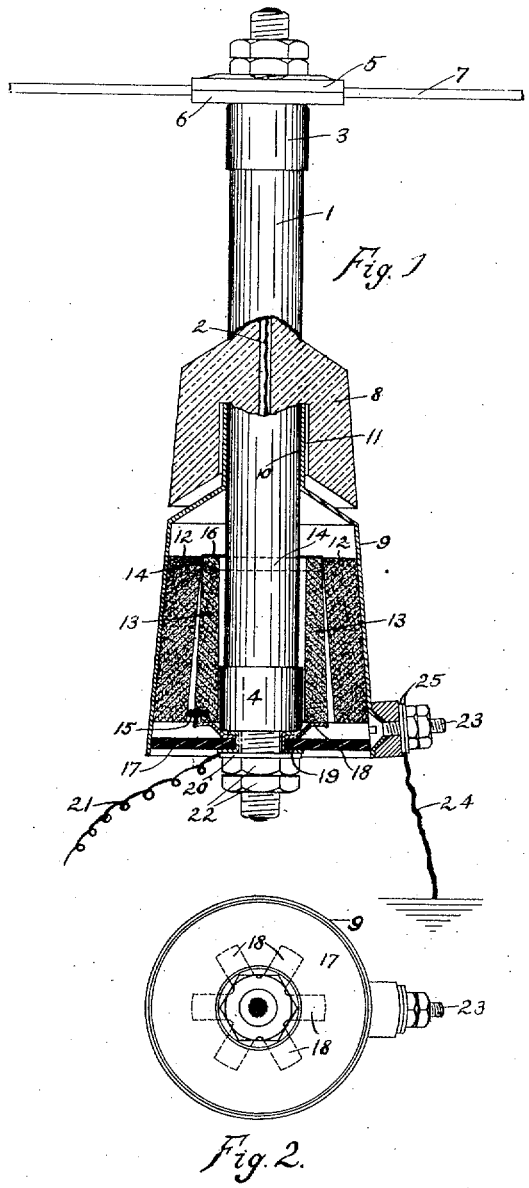

No. 883,626. PATENTED MAR. 31, 1908.
F. B. COOK.
ELECTRICAL LINE PROTECTOR.
APPLICATION FILED SEPT. 26, 1907.

WITNESSES:
Frederick R. Parker.
P. J. Powers

INVENTOR:
Frank B. Cook,

UNITED STATES PATENT OFFICE.

FRANK B. COOK, OF CHICAGO, ILLINOIS.

ELECTRICAL LINE-PROTECTOR.

No. 883,626.  Specification of Letters Patent.  Patented March 31, 1908.

Application filed September 26, 1907. Serial No. 394,694.

*To all whom it may concern:*

Be it known that I, FRANK B. COOK, a citizen of the United States of America, residing at Chicago, in the county of Cook and State of Illinois, have invented a new and useful Electrical Line-Protector, of which the following is a specification, reference being had to the accompanying drawings, illustrating same.

My invention relates to electrical protectors, and in particular to protectors comprising fuses and lightning arresters.

The principal objects of my invention are to provide an improved fuse and lightning arrester device, which may be suspended from a line wire; to provide improved means for inclosing and protecting the lightning arrester, and for conductively connecting same with the fuse; to provide improved means for connecting one electrode of the lightning arrester to ground; to provide a lightning arrester to be used in this connection which is self-cleaning; and to provide compactness, simplicity of construction, efficiency, durability and accessibility in such a protector device.

Other objects will be apparent from the following specification.

While it has been heretofore very desirable to employ line fuses on line wires in branch circuits from the line wires, and to suspend them from the line wires, it is found that it is very necessary in numerous places to have a lightning arrester in connection with the fuse to protect the line circuit and branch circuit from high-potential electricity, such as lightning. A lightning arrester used in this connection diverts objectionable high-potential currents from a portion of the line wire and from the branch circuit and thus protects these circuits from the objectionable high-potential currents.

In this present invention is provided a lightning arrester in connection with a fuse, all adapted to be suspended from a line wire, the lightning arrester being preferably inclosed in a bell-shaped receptacle supported by the fuse. The fuse thus suspended is in a branch circuit from the line wire. As lightning currents are generally of small amperage, the lightning can be carried from the line wire through the fuse to the lightning arrester and thence to ground, in most cases, without blowing the fuse; it not being necessary to blow the fuse unless the current is of such amperage as to endanger the fusing of the line wire or branch circuit. Therefore, in this present invention the lightning arrester is located at the end of the fuse away from the line wire, and a fuse is provided of such capacity that it will not ordinarily blow on the ordinary lightning discharges. With this arrangement the fuse is in the branch circuit leading from the line wire, so as to protect the line wire and branch circuit from an excessive current, generally coming from a cross of the line wire with an electric light, power or trolley wire, whether the excessive current passes from the line wire through the fuse and lightning arrester to ground, or from the line wire through the fuse and branch circuit.

In the accompanying drawings Figure 1 is a side elevation of the protector device of the invention suspended from a line wire, with portions of the device shown in vertical cross-section; and Fig. 2 is a bottom end view of the device of Fig. 1.

Like characters refer to like parts in the several figures.

The fuse casing 1, made of some suitable insulating material, preferably porcelain, carries the fusible conductor 2 in a bore therethrough in the usual manner, and is provided with metallic end caps 3 4 which carry suitable binding nuts and clamping plates for connecting the fuse in circuit. Clamping plates 5 6 may be clamped upon a line wire 7 to suspend the fuse from the line wire as shown. Near the middle of the fuse casing is provided a bell-shaped extension 8, preferably molded or made in one piece with the fuse casing 1. A metallic bell-shaped member 9 is forced on to the lower end of the fuse casing 1 before the end cap 4 is placed thereon, the central neck-like portion 10 of the bell-shaped portion 9 being forced up into an annular recess 11 formed between the bell-shaped portion 8 and the fuse casing 1, preferably as shown. The lightning arrester comprising ring-shaped electrodes 12 13 is placed within the bell-shaped portion 9 preferably as shown, the electrodes 12 13 and the portion 9 being tapered upwardly so as to provide a snug fit between the electrode 12 and the portion 9 and also to provide an annular air gap between the electrodes 12 13 which increases in width toward the bottom end of the electrodes. At the upper end of the electrode 13, on the external cylindrical surface thereof, is provided an insulating coating 14, such as an insulating enamel or cement, and near the lower end of electrode 13 is provided a plurality of insulating pins 15 15, preferably three, set in the electrode 13 and projecting from the external cylindrical surface thereof, the insulating coating 14 and the pins 15 15 being provided to form an air gap between the electrodes 12 13 which increases in width toward the lower end of the electrodes 12 13 so as to allow particles of carbon which may be broken off of the electrode during an electrical discharge therebetween to fall from between the electrodes 12 13 and thereby keep the lightning arrester clean and free from a short-circuit. On the upper end surface of electrode 13 is preferably provided an insulating enamel 16 to keep any foreign particles from forming a leakage or a short-circuit between the electrodes 12 13. At the lower end of the lightning arrester is provided an insulating disk 17, which closes the lower end of the bell-shaped portion 9 and which carries a spring spider the arms 18 18 of which bear against the lower end of electrode 13 to hold the electrodes 12 13 in place within the bell-shaped portion 9 and make electrical connection between the end cap 4 of the fuse and the electrode 13, the spring spider being riveted to the insulating disk 17 by a suitable rivet 19, and a washer 20 bearing against the portion 19 when the nuts 22 on the end cap 4 are screwed up, to bear the arms 18 18 of the spring spider firmly against the electrode 13. A drop conductor 21 may be connected with the end cap 4, preferably between portions 19 and 20 as shown, the inner end of the rivet 19 preferably engaging the annular shoulder of the end cap 4 when nuts 22 are screwed up tightly, to provide a substantial bearing for the rivet 19 and disk 17. One side of the bell-shaped portion 9 is preferably formed outwardly to fit the head of screw 23 which screw is provided with suitable washers 25 and nuts for connecting a ground conductor 24 therewith and conductively with the bell-shaped portion 9. The annular bell-shaped projection 8 on the fuse casing 1 forms a drip for the upper portion of the bell-shaped portion 9 and thereby keeps the annular recess 11 dry during wet weather and thus increases the insulation between the neck-like portion 10 of the bell-shaped portion 9 and the end cap 3 of the fuse.

The circuit through the fuse is from line wire 7, through clamp 5, 6, end cap 3, fusible conductor 2, end cap 4, and rivet 19 and washer 20 to the drop conductor 21. The path from this latter circuit through the lightning arrester to earth is from end cap 4, through rivet 19, spring spider 18, electrode 13, the air gap between electrode 13 and electrode 12, electrode 12, bell-shaped portion 9, screw 23, washers 25 and conductor 24 to earth. An excess of current in the circuit 7, 2, 21 will blow the fuse 2 and thereby protect the portions of this circuit from overheating.

A high-potential current of electricity coming from one portion of conductor 7 will pass through the circuit 2, 4, 13, 12, 24, to earth and will thus be diverted from the other portion of the line wire 7 and from the branch circuit 21.

It will readily be seen that the protector device of this invention may be suspended from a line wire wherever ordinary line fuses are now suspended from the line wires, and that in addition to fuse protection it also furnishes lightning protection.

I do not wish to limit this invention to all of the particular details herein shown, as many modifications thereof may be made without departing from the scope of the appended claims.

What I claim as my invention is:

1. A protector device comprising a fuse adapted to be suspended from a line wire, an annular metallic casing inclosing the lower end of the fuse, a lightning arrester comprising annular electrodes inserted within the said casing around the fuse, an annular drip carried by the fuse above the annular metallic casing, and means for connecting the fuse and lightning arrester as protectors for the circuit.

2. A protector device comprising a fuse adapted to be suspended from a line wire, a bell-shaped metallic casing surrounding the lower portion of the fuse, a lightning arrester comprising annular electrodes carried within the bell-shaped casing and surrounding the fuse, an annular drip carried by the fuse above the bell-shaped casing, an insulating disk closing the lower end of the bell-shaped portion, and suitable means for connecting the fuse and lightning arrester as protectors.

3. A protector device comprising a fuse adapted to be suspended from a line wire, a bell-shaped portion inclosing the lower end of the fuse, a lightning arrester comprising annular electrodes carried within the bell-shaped portion, an insulating disk closing the lower end of the bell-shaped portion, and a spring spider carried by the insulating disk and adapted to bear against one of the said electrodes to hold the lightning arrester in place in the bell-shaped portion.

4. A protector device of the character described comprising an inclosed fuse, a tapered metallic casing surrounding a portion of the fuse, a lightning arrester comprising tapered annular electrodes carried within the said tapered casing and surrounding the fuse, an insulating disk closing the open end of the said tapered casing, a spring spider carried by the said disk, and means for pressing the said spider against one of the said electrodes to wedge the electrodes in the tapered casing substantially as described.

5. A protector device of the character described comprising an inclosed fuse, annular electrodes of a lightning arrester surrounding a portion of the fuse and having their surfaces tapered to provide an annular air gap therebetween which increases in width toward the bottom of the arrester, a casing for the arrester surrounding the fuse, and means for suitably holding the electrodes in the casing and for connecting the arrester as a protector to the fuse circuit.

6. A protector device comprising an inclosed line fuse, a chamber surrounding a portion of the fuse, a lightning arrester contained within the said chamber, and means for suitably connecting the lightning arrester as a protector to the fuse circuit.

7. A protector device comprising a line fuse adapted to be suspended from a line conductor, a chamber surrounding a portion of the fuse, a lightning arrester contained within the said chamber, a drip carried by the fuse above the said chamber to increase the insulation from the wall of the chamber to a terminal of the fuse, and means for connecting the lightning arrester as a protector to the fuse circuit.

8. A protector device comprising an inclosed fuse, a high-potential electricity arrester associated with the fuse and having an electrode thereof conductively connected with a fuse terminal, a suitable casing for the arrester carried by the fuse and engaging an electrode of the arrester, and means for connecting the said casing to earth.

9. A protector device comprising an inclosed fuse, a bell-shaped casing carried by the fuse and surrounding a portion of the latter, an insulating disk closing the open end of the bell-shaped portion to provide an inclosure, a high-potential electricity arrester within the said inclosure having a spark gap between the electrodes which increases in width toward the lower portion of the arrester, and means for suitably connecting the arrester as a protector to the fuse circuit.

10. A protector device comprising an inclosed fuse adapted to be suspended from a line wire and having an annular projection to form a drip, a lightning arrester device carried by the fuse below the said drip, and means for connecting the lightning arrester as a protector to the fuse circuit.

11. A protector device comprising a casing, means for suspending the casing from a line conductor, a lightning arrester comprising concentric electrodes and contained within the said casing, and means for suitably connecting the lightning arrester as a protector to the line conductor.

12. A protector device comprising a casing, means for suspending the casing from a line conductor, a lightning arrester contained within the casing, the said arrester having a spark gap between the electrodes thereof which increases in width toward the lower portion of the arrester, and means for suitably connecting the lightning arrester as a protector to the line conductor.

13. A protector device comprising a casing, means for suspending the casing from a line conductor, a lightning arrester comprising concentric electrodes and contained within the said casing, the said arrester having an annular spark gap between the electrodes thereof which increases in width toward the lower portion of the arrester, and means for suitably connecting the lightning arrester as a protector to the line conductor.

14. A protector device of the character described comprising a tapered metallic casing, means for suspending the casing from a line conductor, a lightning arrester comprising tapered annular electrodes carried within the casing, an insulating disk closing the open end of the casing, a spring spider carried by the said disk, means for pressing the said spider against one of the said electrodes to wedge the electrodes in the tapered casing, and means for suitably connecting the lightning arrester as a protector to the line conductor.

15. A protector device comprising a metallic casing, means for suspending the casing from a line conductor, a lightning arrester contained within the casing, means for connecting the lightning arrester as a protector to the line conductor, and a water shed for the said casing arranged above same.

As inventor of the foregoing I hereunto subscribe my name in the presence of two subscribing witnesses this 23rd day of September, 1907.

FRANK B. COOK.

Witnesses:
FREDERICK R. PARKER,
CLARENCE E. COOK.